United States Patent

Turnis

Patent Number: 5,429,195
Date of Patent: Jul. 4, 1995

[54] OPERABLE COULTER FRAME FOR FARM IMPLEMENTS

[76] Inventor: Joseph J. Turnis, P.O. Box 516, Platte, S. Dak. 57369

[21] Appl. No.: 80,327

[22] Filed: Jun. 22, 1993

[51] Int. Cl.$^6$ .............................................. A01B 49/00
[52] U.S. Cl. ................................. 172/311; 172/662; 172/452; 172/474
[58] Field of Search .............. 172/317, 310, 311, 452, 172/456, 458, 474, 675, 776, 662

[56] References Cited

U.S. PATENT DOCUMENTS

| | | | |
|---|---|---|---|
| 3,186,497 | 6/1965 | Forbes | 172/548 |
| 3,460,631 | 8/1969 | Friesen et al. | 172/311 |
| 3,606,848 | 9/1971 | Dobbs et al. | 111/7 |
| 3,692,121 | 9/1972 | Kenney | 172/456 |
| 4,151,886 | 5/1979 | Boetto et al. | 172/311 |
| 4,336,846 | 6/1982 | Boetto et al. | 172/776 |
| 4,338,872 | 7/1982 | Decker | 111/56 |
| 4,418,762 | 12/1983 | Page | 173/311 |
| 4,418,763 | 12/1983 | Boetto | 172/456 X |
| 4,452,318 | 6/1984 | Boetto | 172/776 X |
| 4,453,601 | 6/1984 | Orthman et al. | 172/776 X |
| 4,813,489 | 3/1989 | Just et al. | 172/175 |
| 4,896,732 | 10/1990 | Stark | 172/311 |
| 5,168,936 | 12/1992 | Stevens | 172/662 |
| 5,178,328 | 1/1993 | Broyhill | 239/168 |

Primary Examiner—Randolph A. Reese
Assistant Examiner—Victor Batson
Attorney, Agent, or Firm—Zarley, McKee, Thomte, Voorhees & Sease; Mark D. Frederiksen

[57] ABSTRACT

An operable coulter frame is removably mounted on a farm implement of the type having a tool bar with foldable ends. The operable frame includes a central shaft rotatably mounted on the tool bar, and a pair of auxiliary shafts rotatably mounted on the foldable ends of the tool bar. The auxiliary shafts engage the central shaft when the tool bar and foldable ends are located in a coaxial operable position. A support bar is mounted to the central shaft, with auxiliary support bars mounted to the auxiliary shafts, for pivotal movement with the rotation of the associated shafts. Ground working tools are mounted on the support bars and movable between a lowered operable position located forwardly of the tool bar and tool bar ends, and an upper storage position raised above the tool bar and tool bar ends. A drive motor is mounted on the implement and connected to the central shaft to raise and lower the support bars.

6 Claims, 8 Drawing Sheets

5,429,195

OPERABLE COULTER FRAME FOR FARM IMPLEMENTS

TECHNICAL FIELD

The present invention relates generally to farm implements with forwardly projecting coulters mounted on a hinged tool bar, and more particularly to an improved support frame for the coulters which is operable to raise the coulters above the tool bar to permit folding of the tool bar.

BACKGROUND OF THE INVENTION

As the size of the average farm has increased over the past years, the relative size of farm implements has also increased. It is now common to find various implements, such as planters and the like to extend to such a great width that the implement cannot be easily transported from the storage site to the field. For this reason, such implements now incorporate a hinged tool bar which permits the distal ends of the tool bar to be folded inwardly to reduce the overall width of the implement during transport.

In order to increase farming productivity, and decrease the number of passes over a given field, it has become common practice to mount coulters forwardly from a tool bar ahead of each planter apparatus to fertilize or otherwise condition the soil forwardly of the planting operation. One example of such an apparatus is shown in FIG. 1, showing a conventional planter 10 with a coulter frame 12 clamped to project forwardly of the planter foldable tool bar 14. Tool bar 14 includes right and left foldable tool bar ends 16 and 18 pivotally connected to the distal ends 14a and 14b respectively of tool bar 14 by hinges 20 and 22 respectively. It can be seen that hinges 20 and 22 permit foldable tool bar ends 16 and 18 to pivot forwardly about hinges 20 and 22 within the horizontal plane encompassed by tool bar 14, to a position wherein ends 16 and 18 are generally parallel to tool bar 14.

However, the attachment of coulter frame 12, having individual coulters 24 adjustably mounted thereon, to tool bar 14 and tool bar ends 16 and 18, prevents the pivotal movement of tool bar ends 16 and 18. Thus, coulter frame 12 is advantageous in permitting the application of fertilizer simultaneous with the planting operation. However, the benefits of the foldable tool bar are eliminated, since ends 16 and 18 are not permitted to pivot while coulter frame 12 is attached thereto.

SUMMARY OF THE INVENTION

It is therefore a general object of the present invention to provide an improved coulter frame which is operable to permit folding of a foldable tool bar.

Another object of the present invention is to provide an operable coulter frame which may be mounted to a conventional foldable tool bar without modifications to the tool bar.

Still another object of the present invention is to provide an operable coulter frame which retains coulters on the tool bar, yet permits folding of the distal ends of the foldable tool bar.

These and other objects will be apparent to those skilled in the art.

The operable coulter frame of the present invention is removably mounted on a farm implement of the type having a tool bar with foldable ends. The operable frame includes a central shaft rotatably mounted on the tool bar, and a pair of auxiliary shafts rotatably mounted on the foldable ends of the tool bar. The auxiliary shafts are designed to engage the central shaft when the tool bar and foldable ends are located in a coaxial operable position. A support bar is mounted to the central shaft, with auxiliary support bars mounted to the auxiliary shafts, for pivotal movement with the rotation of the associated shafts. Ground working tools, such as coulters, are mounted on the support bars and are thereby movable between a lowered operable position located forwardly of the tool bar and tool bar ends, and an upper storage position raised above the tool bar and tool bar ends. A drive motor is mounted on the implement and connected to the central shaft to raise and lower the support bars with their ground working tools such that the tool bar ends may be pivoted to the storage position when the support bars are raised to their storage positions.

DESCRIPTION OF THE PREFERRED EMBODIMENT

Figure 1:
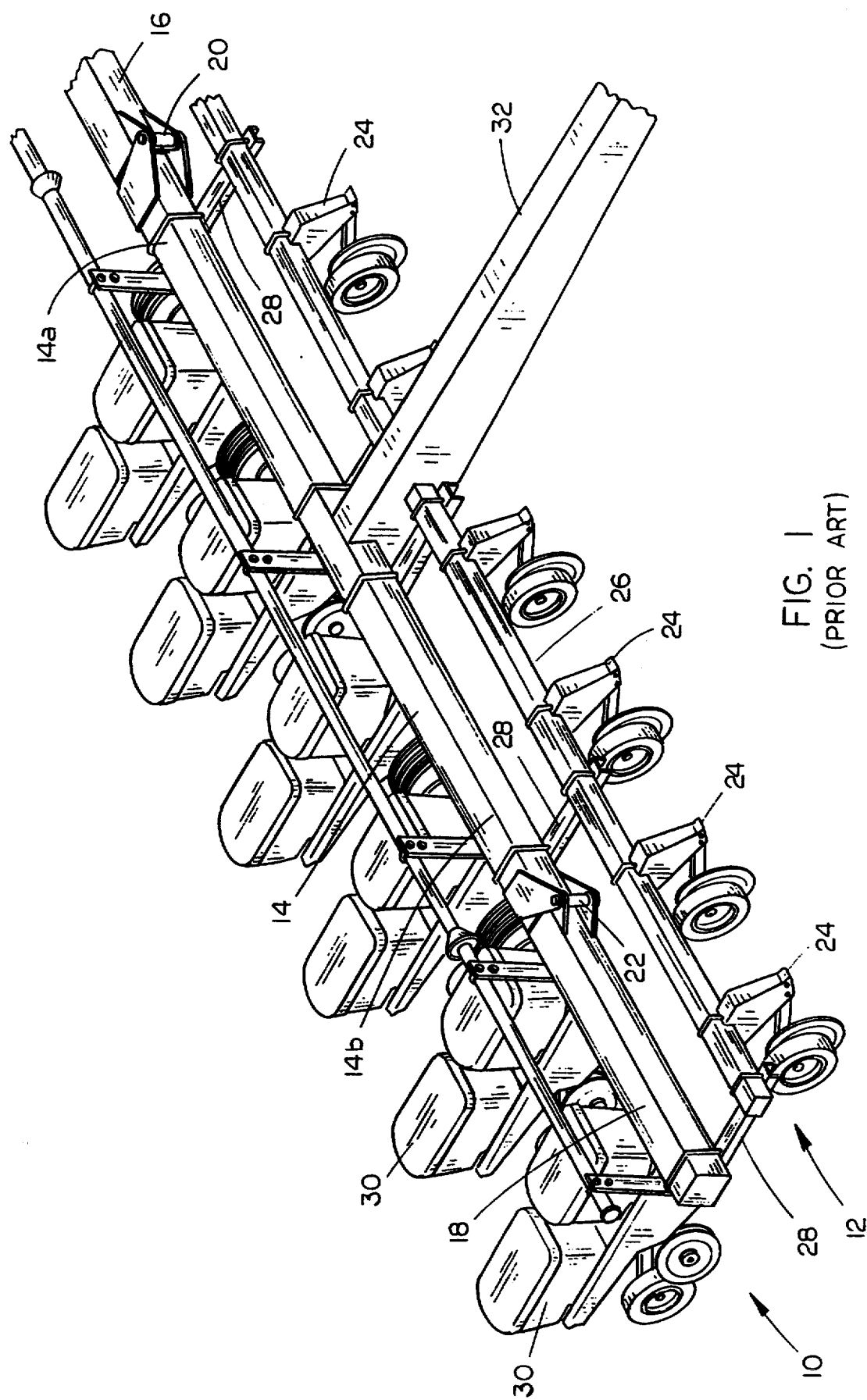
FIG. 1 is a perspective view of a prior art foldable tool bar with a conventional coulter frame mounted thereon.

Referring now to the drawings, in which similar or corresponding parts are identified with the same reference numeral, and more particularly to FIG. 1, a conventional planter having a foldable tool bar is designated generally at 10. Tool bar 14 includes right and left foldable ends 16 and 18 respectively, pivotally connected to right and left ends 14a and 14b respectively of tool bar 14. Right and left hinges 20 and 22 connect foldable ends 16 and 18 respectively to tool bar 14 such that ends 16 and 18 pivot within a horizontal plane from a work position coaxial with tool bar 14 (as shown in FIG. 1) to a transport position generally parallel with tool bar 14 (not shown).

A coulter frame 12 is rigidly mounted to tool bar 14 and foldable ends 16 and 18, and includes a plurality of coulter assemblies 24 adjustably mounted on a coulter support bar 26, which is mounted parallel and spaced forwardly ahead of tool bar 14. A plurality of forwardly projecting support arms 28 are clamped to tool bar 14 and foldable ends 16 and 18 to support coulter support bar 26 rigidly forwardly of tool bar 14 and ends 16 and 18. Coulter assemblies 24 are each aligned forwardly of a planter apparatus 30, which are spaced uniformly rearwardly of tool bar 14 and foldable ends 16 and 18. Tool bar 14 is towed behind a tractor by a draw bar 32 which is rigidly mounted to the center of tool bar 14.

As discussed hereinabove, the attachment of coulter frame 12 to tool bar 14 and foldable ends 16 and 18 prevents foldable ends 16 and 18 from being pivotable between the working and transport positions. Thus, the foldability of planter 10 is eliminated unless coulter frame 12 is removed from the tool bar 14 and foldable ends 16 and 18.

Figure 2:
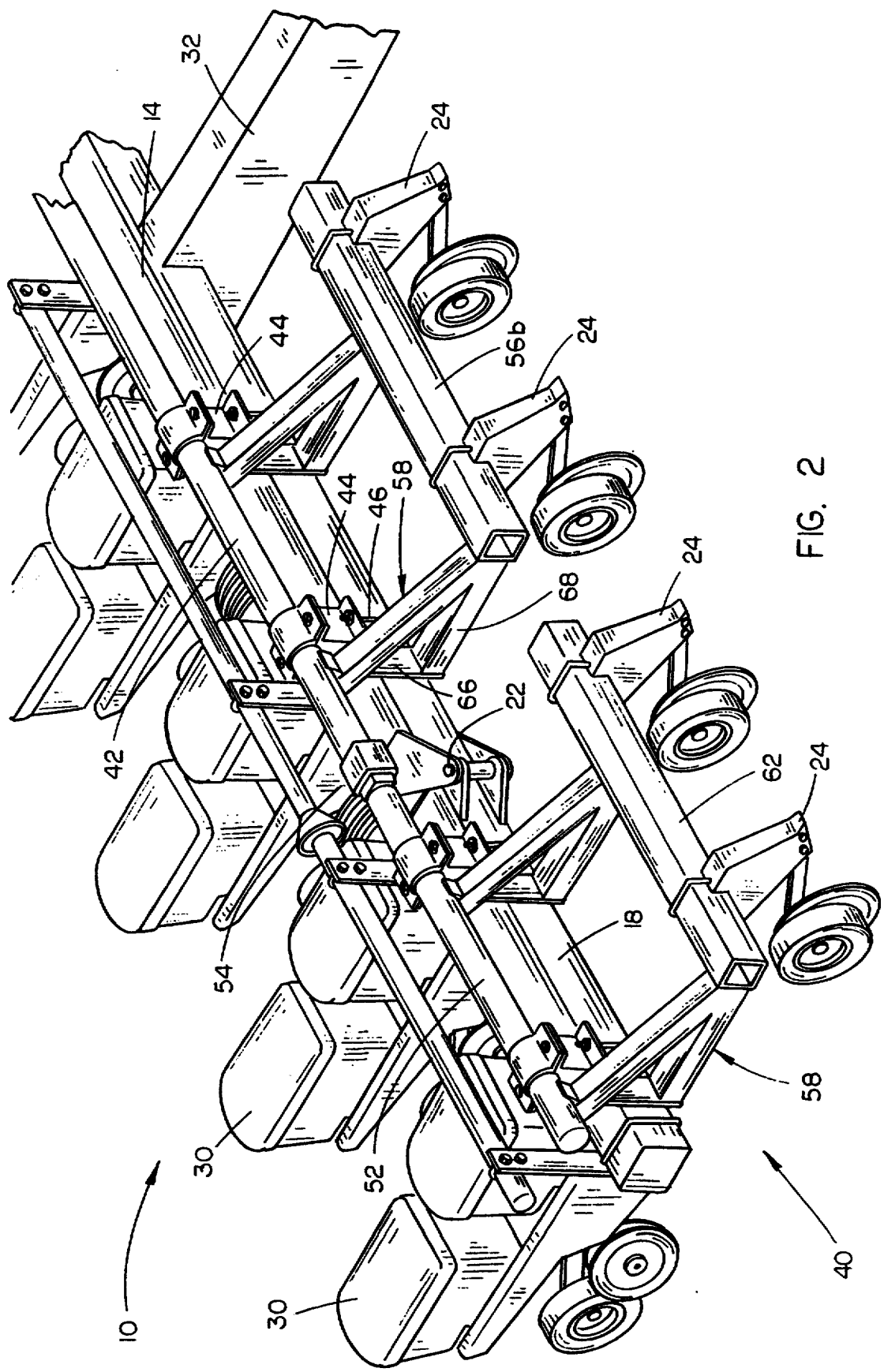
FIG. 2 is a perspective view similar to FIG. 1, with the operable coulter frame of the present invention mounted on a conventional foldable tool bar.
Figure 3:
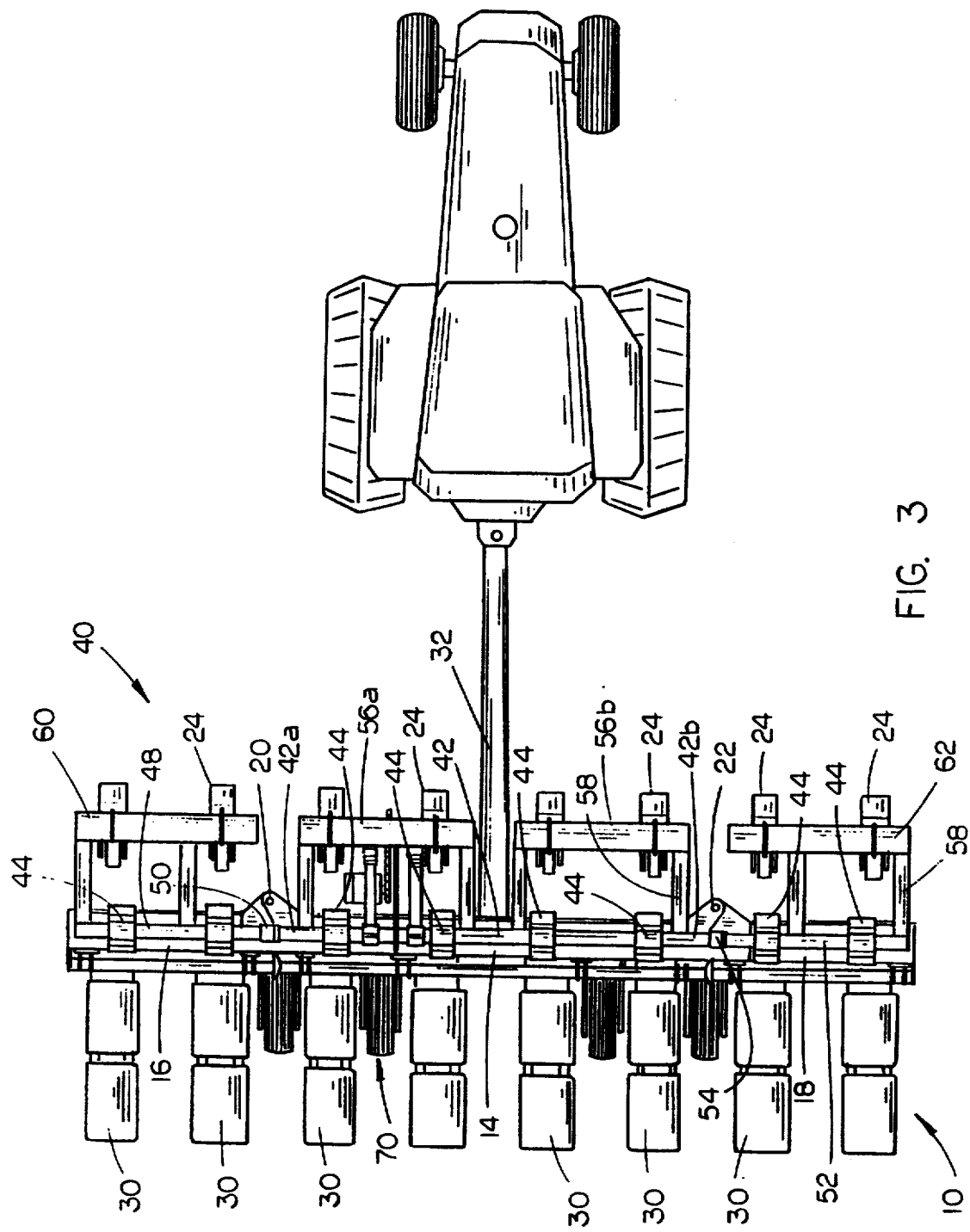
FIG. 3 is a top plan view of the present invention mounted on a conventional planter with a tractor towing the implement.

Referring now to FIGS. 2 and 3, the operable coulter frame of the present invention is designated generally at 40 and is shown mounted on the same prior art planter 10 shown in Figure 1. Thus, planter 10 includes tool bar 14, foldable ends 16 and 18, hinges 20 and 22, a draw bar 32 towing tool bar 14, and a plurality of seed assemblies 30 supported rearwardly of tool bar 14 and foldable ends 16 and 18. In addition, the conventional coulter assemblies 24 are utilized with the operable coulter frame 40 of the present invention.

Operable coulter frame 40 includes an elongated central shaft 42 mounted for rotation on its longitudinal axis on a plurality of spaced-apart bearings 44 which are removably mounted to the upper surface of tool bar 14 with U-bolts 46 in a conventional manner. A right auxiliary shaft 48 is rotatably mounted on a pair of bearings 44 to the upper surface of right end 16, and is connected to the right end 42a of shaft 42 by joint 50, described in more detail hereinbelow. Similarly, a left auxiliary shaft 52 is rotatably mounted on bearings 44 to the upper surface of left foldable end 18 and is connected to the left end 42b of shaft 42 at left joint 54, also described in more detail hereinbelow.

Shaft 42 has right and left elongated coulter support bars 56a and 56b connected forwardly thereof and parallel thereto by a plurality of support arms 58. Similarly, a right auxiliary coulter support bar 60 is mounted parallel and forwardly of right auxiliary shaft 48 for movement therewith, by support arms 58. A left auxiliary coulter support bar is mounted to left auxiliary shaft 52 for movement therewith by support arms 58. Coulter support bars 56, 60 and 62 are mounted to there respective shafts 42, 48 and 52 for operable movement therewith, and are axially aligned so as to support coulter assemblies 24 at the same level with respect to the ground.

Figure 4:
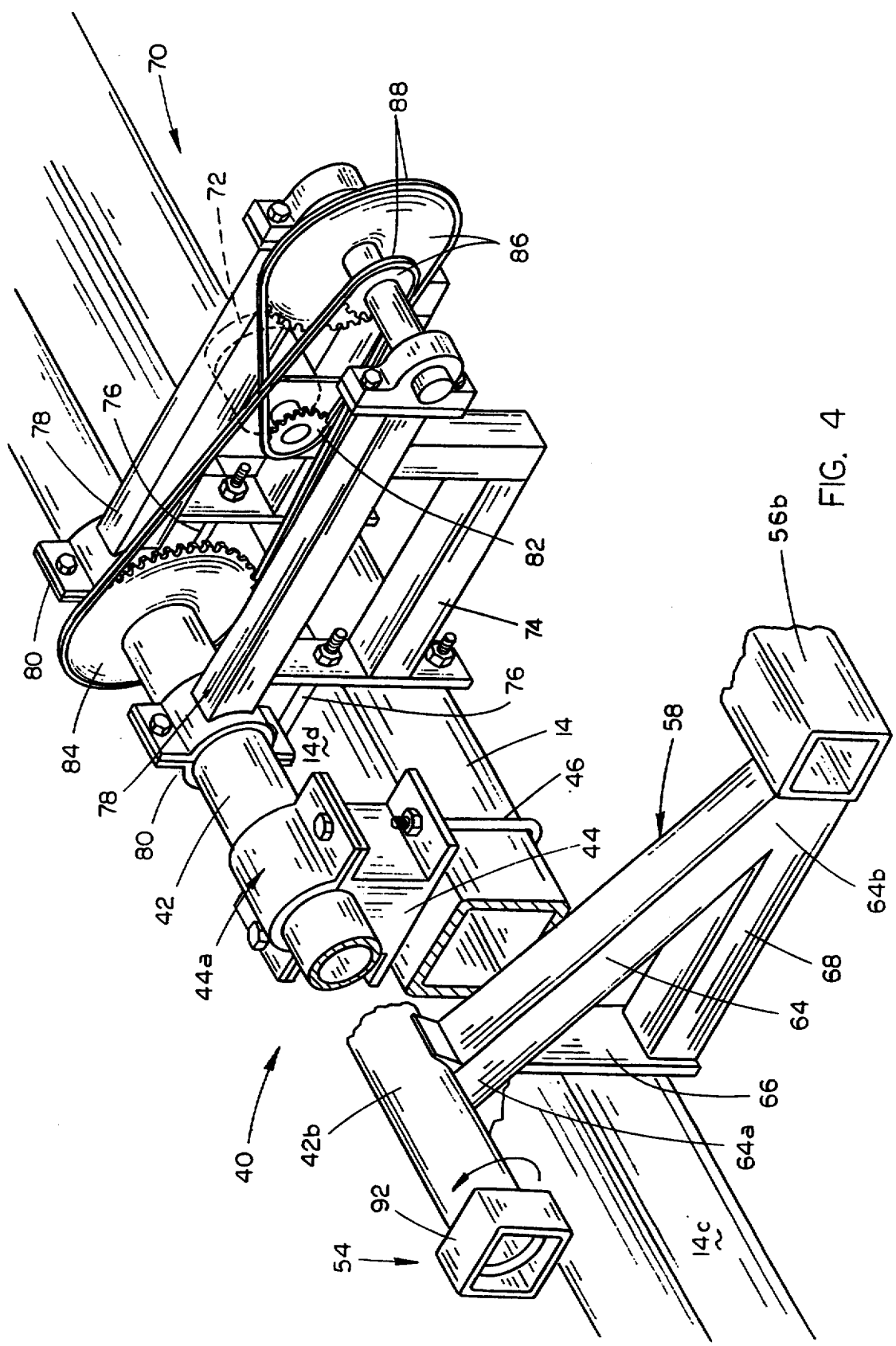
FIG. 4 is an enlarged perspective view of the drive mechanism and a portion of the operable coulter frame of the present invention.

Referring now to FIG. 4, a typical support arm 58 is shown in more detail. Support arm 58 includes a support member 64 having a rearward end 64a affixed to shaft 42 and extends perpendicularly therefrom such that support member 64 will pivot through a generally vertical plane about the longitudinal axis of shaft 42. The forward end 64b from support member 64 is affixed to coulter support bar 56b to pivot coulter support bar 56b therewith. A strap 66 depends from the rearward end 64a of support member 64 and is affixed in position by a cross-member 68 extending between the lower end of strap 66 and the forward end of support member 64. Strap 66 is located so as to contact the forward face 14c of tool bar 14 and act as a stop to prevent further downward pivotal movement of support arm 58. Thus, coulter support bar 56b is shown in a position wherein coulter assemblies 24 are in the lowered working position shown in FIG. 2.

As discussed above, central shaft 42 and auxiliary shafts 48 and 52 are supported on the top surface 14d of tool bar 14 and foldable ends 16 and 18 by bearings 44. FIG. 4 shows one bearing 44 fastened by U-bolt 46 to tool bar 14. Preferably, bearing 44 has a removable upper collar portion 44a to permit ease of replacement or repair of the bearing 44 or shaft 42 operably mounted therein.

FIG. 4 also shows drive assembly 70 which is connected to central shaft 42 to selectively rotate shaft 42 between the lower working position and an upper storage position. Drive assembly 70 includes an hydraulic motor 72 mounted on a support frame 74 which is removably clamped to tool bar 14 by U-bolts 76. Support frame 74 includes a pair of rearwardly projecting legs 78 with collars 80 operably connected to central shaft 42, to permit rotation of shaft 42 within collars 80. Motor 72 has a drift gear 82 which is interconnected to a large gear 84 mounted on central shaft 42 so as to rotate shaft 42. Intermediate gears 86 and chains 88 translate the movement of drive gear 82 to the desired ratio with respect to rotation of central shaft 42.

Figure 5:
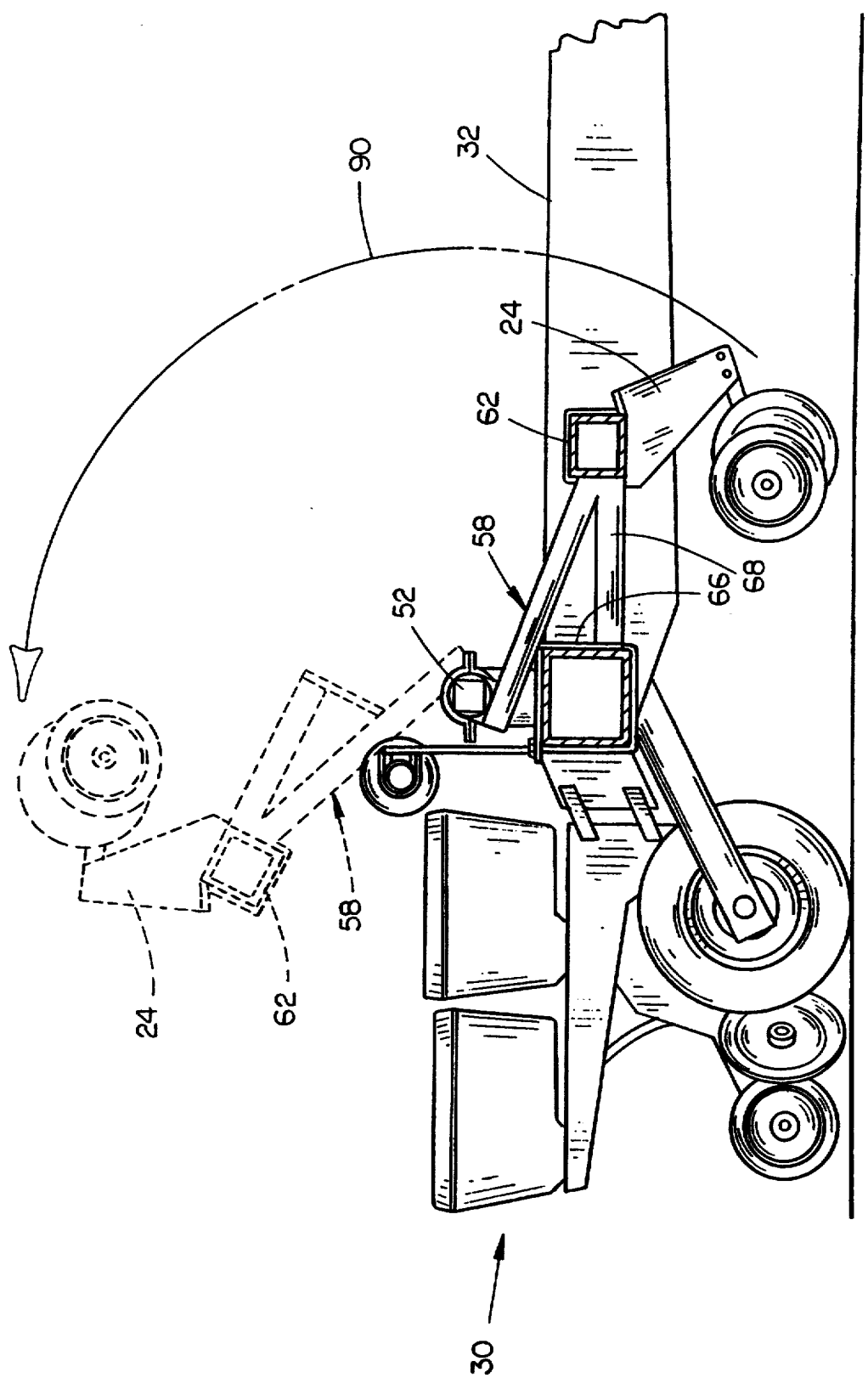
FIG. 5 is an enlarged side elevational view of the planter and invention.

Referring again to FIG. 3, drive assembly 70 serves to rotate shafts 42, 48, and 52, thereby raising or lowering coulter support bars 56, 60 and 62. FIG. 5 shows one support arm 58 supporting left auxiliary coulter support bar 62 in the lowered working position, supporting a coulter assembly 24 directly ahead of a seed assembly 30. Rotation of left auxiliary shaft 52 will raise coulter support bar 62 and coulter assembly 24, as shown by arrow 90, to an upward storage position shown in broken lines in FIG. 5. Once shaft 52 is rotated back to the working position, strap 66 will stop support arms 58 in the desired working position.

Figure 6:
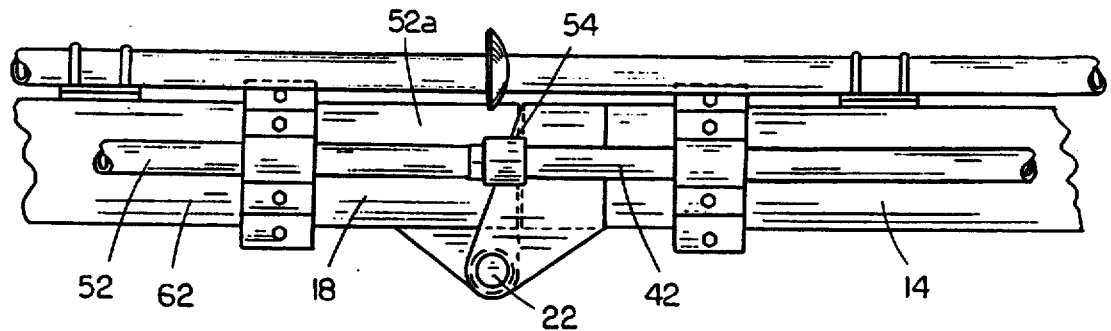
FIG. 6 is an enlarged top view of one hinge portion of the tool bar with the tool bar in the extended position.
Figure 7:
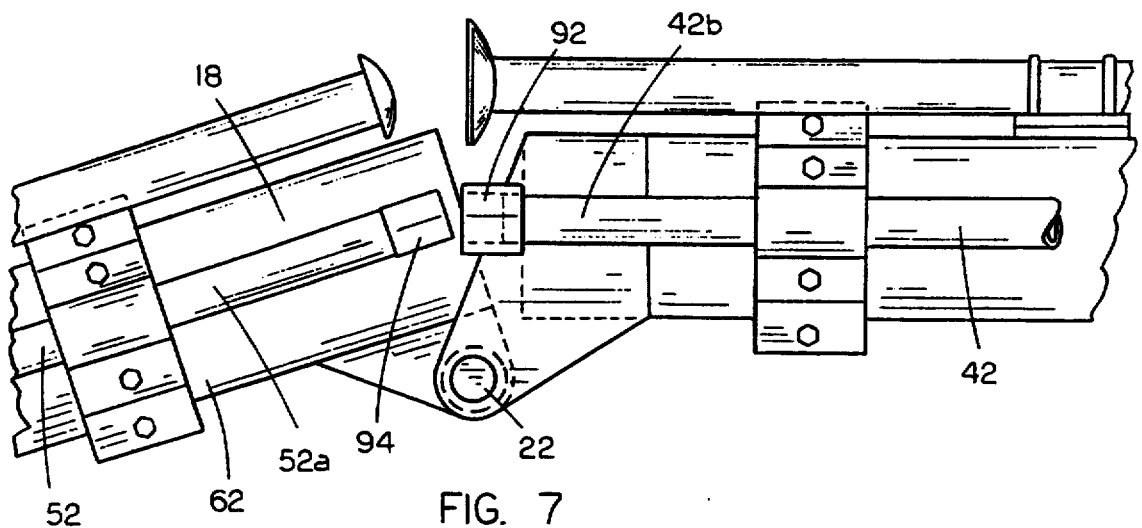
FIG. 7 is a top plan view similar to FIG. 6, with the tool bar partially folded.
Figure 8:
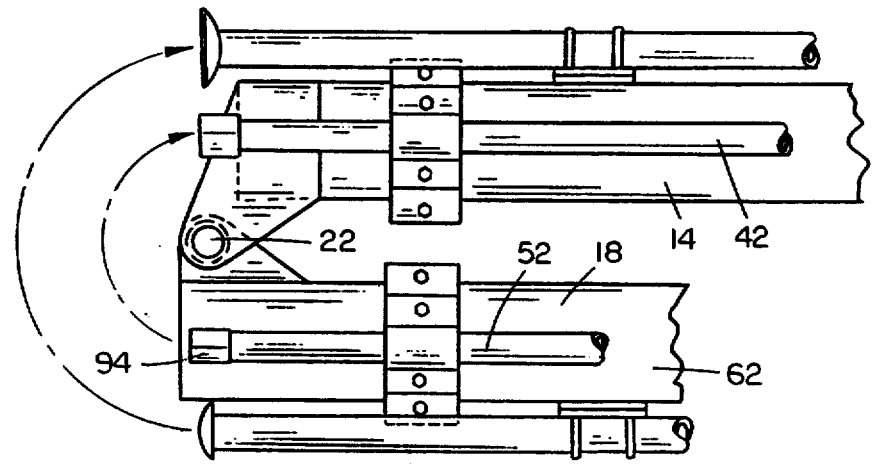
FIG. 8 is a top plan view similar to FIGS. 6 and 7, with the tool bar folded to the transport position.

FIGS. 6, 7 and 8 show left hinge 22 and the operable connection between tool bar 14 and left foldable end 18, as well as between central shaft 42 and left auxiliary shaft 52 at left joint 54. Left joint 54 includes a square socket 92 affixed to the left end 42b of central shaft 42 and projecting outwardly and coaxially therefrom. The inner end 52a of left auxiliary shaft 52 has a plug 94 having a generally square cross-section which corresponds with square socket 92 to be received by socket 92 and engaged therewith when shaft 52 is coaxial with shaft 42, as shown in FIG. 6. Plug 94 is slidably engaged within socket 92 such that pivotal movement of end 18 on hinge 22 will disengage plug 94 from socket 92, as shown in FIGS. 7 and 8. Hinge 22 permits end 18 to pivot to a transport position generally parallel to tool bar 14, as shown in FIG. 8.

When it is desired to fold planter 10 so as to transport the implement down the road or the like, drive assembly 70 (see FIGS. 3 and 4) is operated so as to raise coulter support bars 56, 60 and 62 from the work position to the storage position. FIG. 5 shows coulter support bars 56, 60 and 62 in the raised position in broken lines. It can be seen that the weight of coulter assemblies 24 on the associated coulter support bars 56, 60 and 62 is pivoted beyond the vertical, so as to be biased rearwardly over the associated seed assemblies 30.

Figure 9:
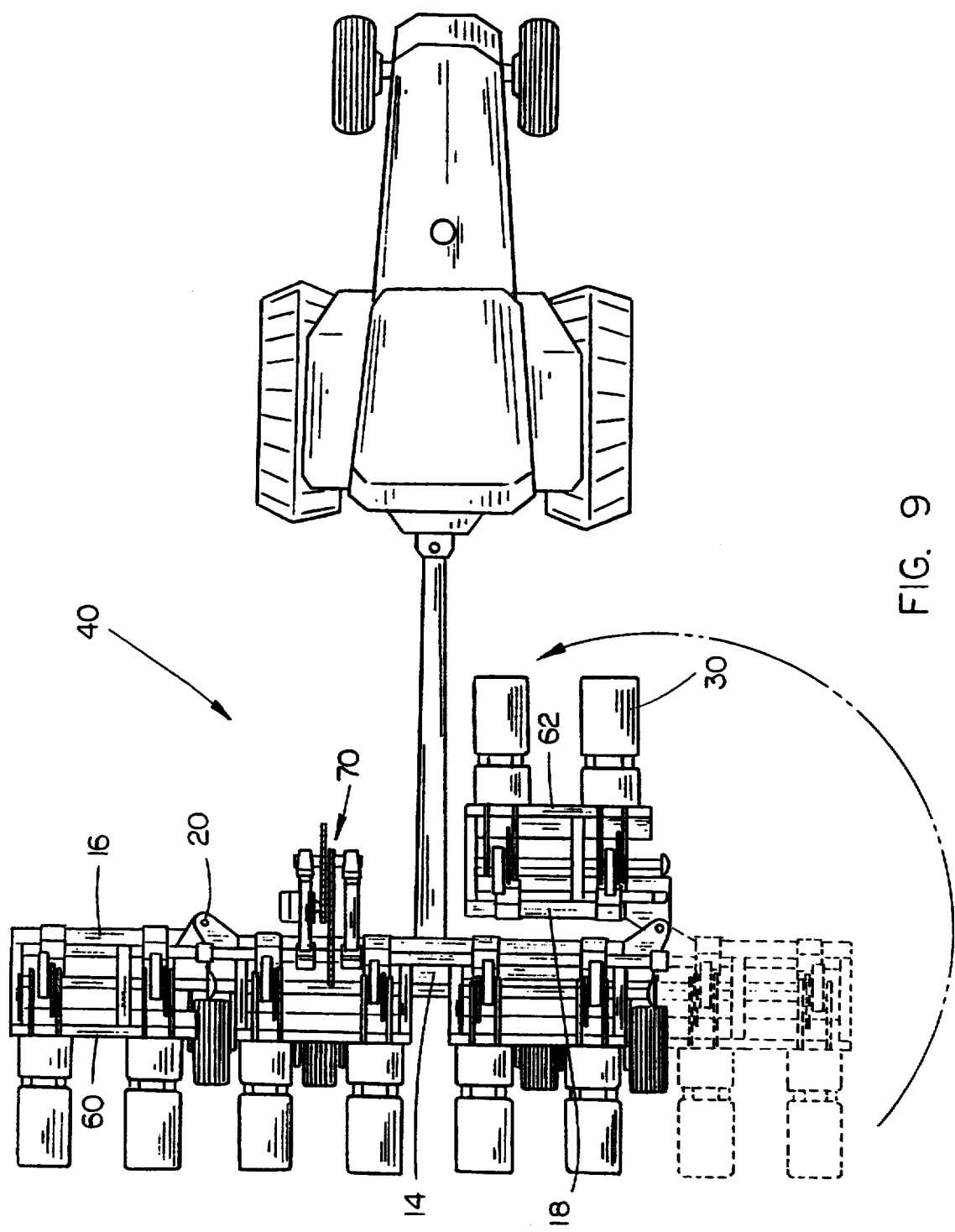
FIG. 9 is a top plan view similar to FIG. 3, with one foldable end of the tool bar folded into the transport position.
Figure 10:
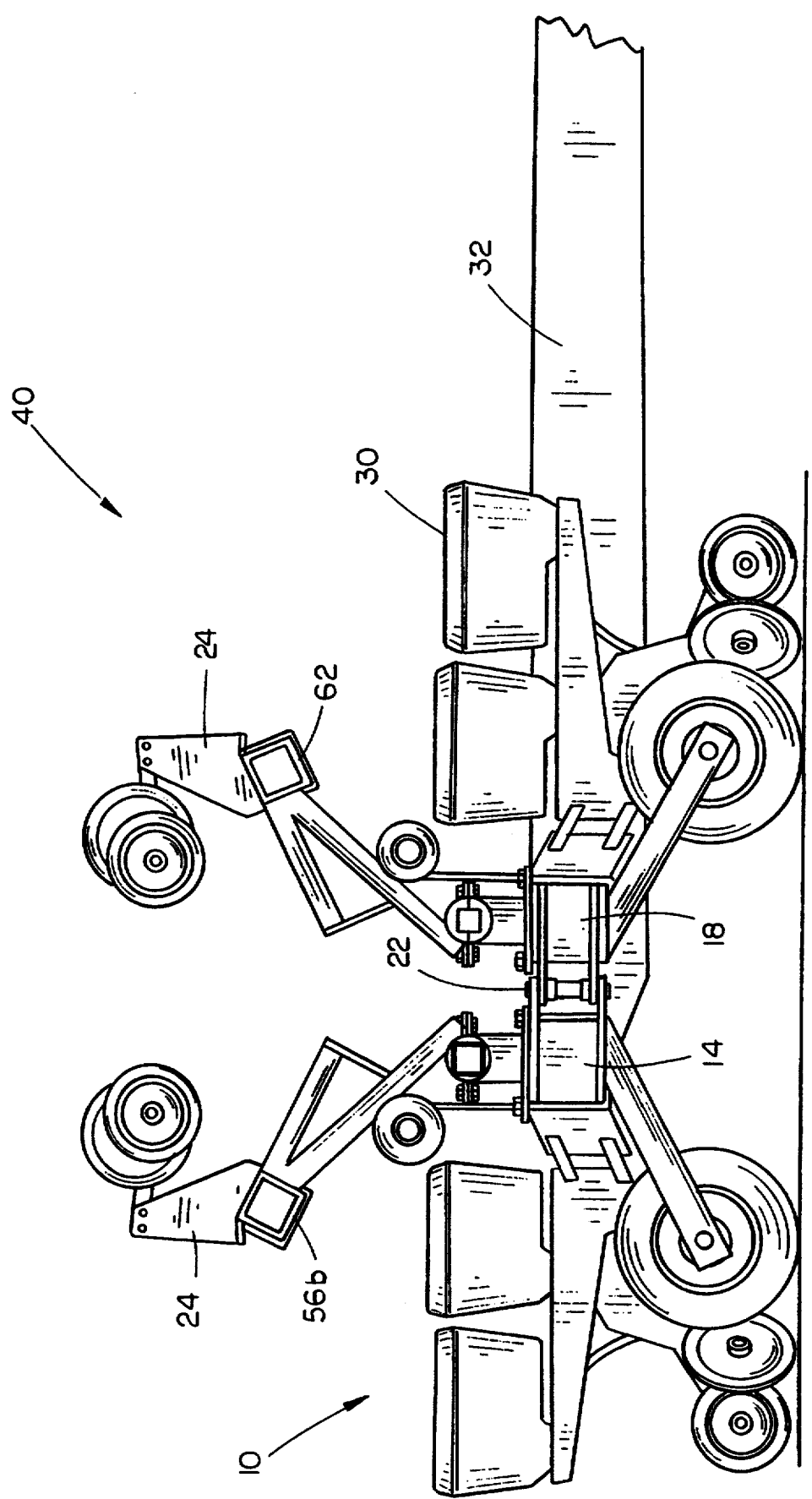
FIG. 10 is a side elevational view of the apparatus shown in FIG. 9.

Each foldable end 16 and 18 may then be manually pivoted about hinges 20 and 22 to the folded transport position. FIG. 9 shows left end 18 pivoted about hinge 22 to the transport position, with end 18 generally parallel to tool bar 14. FIGS. 6–8 show the disconnection of plug 94 from socket 92 as left foldable end 18 is moved to the transport position shown in FIG. 8. Foldable ends 16 and 18 are locked in the folded position in a conventional manner. FIG. 10 is a side elevational view of coulter frame 40 in the transport position with coulter assemblies 24 raised upwardly in the transport position. This procedure is simply reversed in order to extend planter 10 to the work position shown in FIG. 3.

Whereas the invention has been shown and described in connection with the preferred embodiment thereof, it will be understood that many modifications, substitutions and additions may be made which are within the intended broad scope of the appended claims. There has therefore been shown and described an improved operable coulter frame which accomplishes all of the above stated objects.

I claim:

1. In combination:
   a towed implement, comprising:
   a tool bar having right and left foldable ends, said ends pivotable on vertical pivot axes between an operable position coaxial with the tool bar, and a folded position pivoted forwardly and parallel to the tool bar;
   a draw bar connected to the tool bar and extending forwardly therefrom for connection to a prime mover; and
   an operable frame removably mounted on said tool bar operable to selectively raise a plurality of ground working tools from an operation position forwardly and below said tool bar and tool bar ends, to a storage position raised above said tool bar and tool bar ends so as to permit pivotal movement of the tool bar ends to the folded position with the ground working tools connected thereto.

2. The combination of claim 1 wherein said operable frame includes:
   an elongated central shaft rotatably mounted on said tool bar for rotation on the longitudinal axis of the shaft;
   an elongated right auxiliary shaft rotatably mounted on said tool bar right end for pivotal movement with the right end and rotational movement on the longitudinal axis of said auxiliary shaft;
   an elongated left auxiliary shaft rotatably mounted on said tool bar left end for pivotal movement with the left end and rotational movement on the longitudinal axis of the left auxiliary shaft;
   said right and left auxiliary shafts located on said right and left ends for operable engagement with said central shaft when said tool bar ends are in their operable positions, for rotational movement with said central shaft;
   a central support bar connected to said central shaft for movement about the rotational axis of the central shaft, said central support bar spaced away from and oriented parallel to said central shaft;
   at least one of a plurality of ground working tools mounted on said central support bar for movement therewith;
   a right auxiliary support bar connected to said right auxiliary shaft for movement about the rotational axis of the right auxiliary shaft, said right auxiliary support bar spaced away from and oriented parallel to said right auxiliary shaft;
   at least one of a plurality of ground working tools mounted on said right auxiliary support bar for movement therewith;
   a left auxiliary support bar connected to said left auxiliary shaft for movement about the rotational axis of the left auxiliary shaft, said left auxiliary support bar spaced away from and oriented parallel to said left auxiliary shaft for movement therewith; and
   at least one of a plurality of ground working tools mounted on said left auxiliary support bar for movement therewith.

3. The combination of claim 2, further comprising drive means mounted on said implement and operably connected to said central shaft for selectively rotating said shaft to move said ground working tools between the operable and storage positions on said frame.

4. The combination of claim 2, wherein said operable frame further comprises stop means for preventing rotational movement of said central and auxiliary shafts beyond the operable position when moved from the storage position.

5. The combination of claim 2, wherein said ground working tools are adjustably mounted for selective connection along the lengths of said support bars.

6. In combination:
   a towed implement, comprising:
   a tool bar having a central section and right and left foldable ends, said ends pivotable on vertical pivot axes between an operable position coaxial with the central section, and a folded position pivoted forwardly and generally parallel to the central section;
   a first set of ground working tools operably mounted on said tool bar central section, left end and right, end, each ground working tool extending rearwardly from the tool bar and operably mounted for selective engagement with the ground;
   a draw bar connected to the tool bar and extending forwardly therefrom for connection to a prime mover; and
   an operable frame removably mounted on said tool bar to raise a second set of ground working tools from an operable position located forwardly and below said tool bar, at a storage position raised above the tool bar so as to permit pivotal movement of the right and left ends to the folded position with the second set of ground working tools connected thereto.

* * * * *